(12) United States Patent
Suenaga et al.

(10) Patent No.: US 10,597,790 B2
(45) Date of Patent: Mar. 24, 2020

(54) REFINED COPPER, METHOD OF PRODUCING REFINED COPPER, ELECTRIC WIRE AND METHOD OF MANUFACTURING ELECTRIC WIRE

(71) Applicant: Hitachi Metals, Ltd., Tokyo (JP)

(72) Inventors: Kazufumi Suenaga, Hitachinaka (JP); Setsuo Ando, Hitachi (JP); Yuju Endo, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 386 days.

(21) Appl. No.: 15/194,366

(22) Filed: Jun. 27, 2016

(65) Prior Publication Data

US 2017/0327961 A1 Nov. 16, 2017

(30) Foreign Application Priority Data

May 10, 2016 (JP) .................................. 2016-094587

(51) Int. Cl.
*C25C 1/12* (2006.01)
*C22B 15/00* (2006.01)
(Continued)

(52) U.S. Cl.
CPC ............... *C25C 1/12* (2013.01); *C22B 15/00* (2013.01); *C22C 9/00* (2013.01); *H01B 1/026* (2013.01); *Y02P 10/236* (2015.11)

(58) Field of Classification Search
CPC ... C25D 3/00; C25D 3/38; C25D 3/58; C25D 5/00; C25D 5/02; C25D 5/16; C25D 5/34; C25D 5/54; C25D 7/06; C25D 7/0607; C25D 7/0642; C25D 9/08; C25D 13/16; C25D 15/00; C22B 15/00; C23C 28/00; C25C 1/12; C22C 9/00; Y02P 10/236; H01B 1/026
See application file for complete search history.

(56) References Cited

U.S. PATENT DOCUMENTS 3,615,364 A * 10/1971 Rubak ................. C22B 5/00
75/363
4,659,436 A * 4/1987 Kaylor ................ B23D 61/127
205/110

(Continued)

FOREIGN PATENT DOCUMENTS

| CN | 102016088 A | 4/2011 |
| JP | H01-152291 A | 6/1989 |

(Continued)

OTHER PUBLICATIONS

"Purity FAQ" Ames Laboratory https://www.ameslab.gov/mpc/purityFAQ (Year: 2018).*

(Continued)

*Primary Examiner* — Alexandra M Moore
(74) *Attorney, Agent, or Firm* — McGinn I. P. Law Group, PPLC.

(57) ABSTRACT

A method of producing a refined copper includes depositing the refined copper on a cathode by an electroplating process or an electroless plating process in an alkaline plating bath including a solution of a copper compound that includes none of sulfur, chlorine and oxygen elements and produces copper ions having a valence of +1 in the solution.

13 Claims, 12 Drawing Sheets

(51) Int. Cl.
*C22C 9/00* (2006.01)
*H01B 1/02* (2006.01)

(56) References Cited

U.S. PATENT DOCUMENTS

| | | | |
|---|---|---|---|
| 8,202,411 B2* | 6/2012 | Buschmann | C25C 1/12 204/198 |
| 8,596,333 B2 | 12/2013 | Aoyama et al. | |
| 2008/0223728 A1 | 9/2008 | Shindo et al. | |
| 2009/0272466 A1 | 11/2009 | Shindo et al. | |
| 2010/0230069 A1 | 9/2010 | Aoyama et al. | |
| 2010/0263905 A1 | 10/2010 | Aoyama et al. | |
| 2011/0123389 A1 | 5/2011 | Shindo et al. | |
| 2011/0163447 A1 | 7/2011 | Fukushima et al. | |

FOREIGN PATENT DOCUMENTS

| | | |
|---|---|---|
| JP | H10-007491 A | 1/1998 |
| JP | H10-008244 A | 1/1998 |
| JP | 2005-240146 A | 9/2005 |
| JP | 2006-057129 A | 3/2006 |
| JP | 2006-272422 A | 10/2006 |
| JP | 2006-274383 A | 10/2006 |
| JP | 2010-234442 A | 10/2010 |
| JP | 2011-168892 A | 9/2011 |
| JP | 2011-190540 A | 9/2011 |
| WO | WO 2005/073434 A1 | 8/2005 |
| WO | WO 2006/134724 A1 | 12/2006 |
| WO | WO 2010/038641 A1 | 4/2010 |
| WO | WO 2010/038642 A1 | 4/2010 |

OTHER PUBLICATIONS

Japanese Office Action in Application No. 2016-094587 dated Aug. 23, 2016 with an English translation thereof.
Japanese Office Action in Application No. 2016-127547 dated Aug. 23, 2016 with an English translation thereof.
Seigi Aoyama, "Pure Copper and Dilute Copper Alloy Wires Being Controlled Trace Impurities and Additive Elements", Materia, 2012, vol. 51, No. 6, pp. 251-257.
Motoo Kawasaki, Hidehiko Enomoto, "Plating Textbook", Japan, Oct. 4, 1996, p. 65.
Rihei Tomono, "Practical Manual of Plating", Japan, Oct. 25, 1971, p. 153.
Chinese Office Action, dated Oct. 22, 2019, in Chinese Application No. 201610507180.1 and English Translation thereof.

* cited by examiner

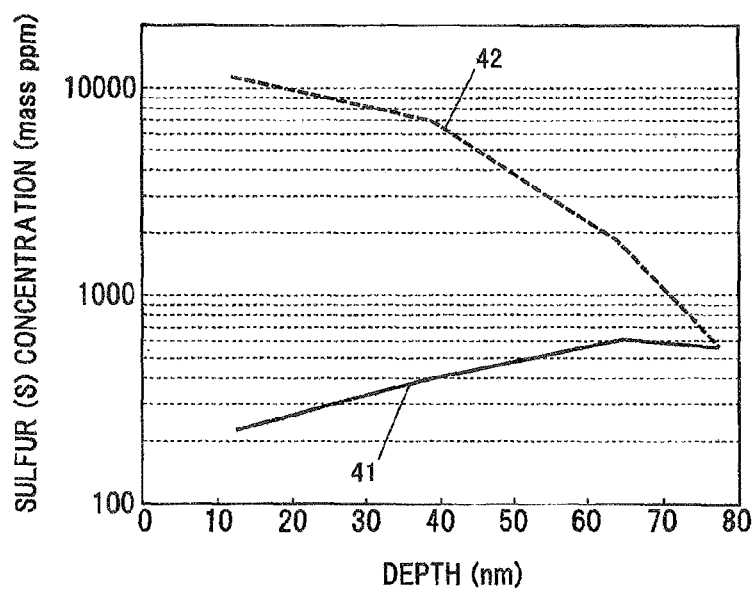
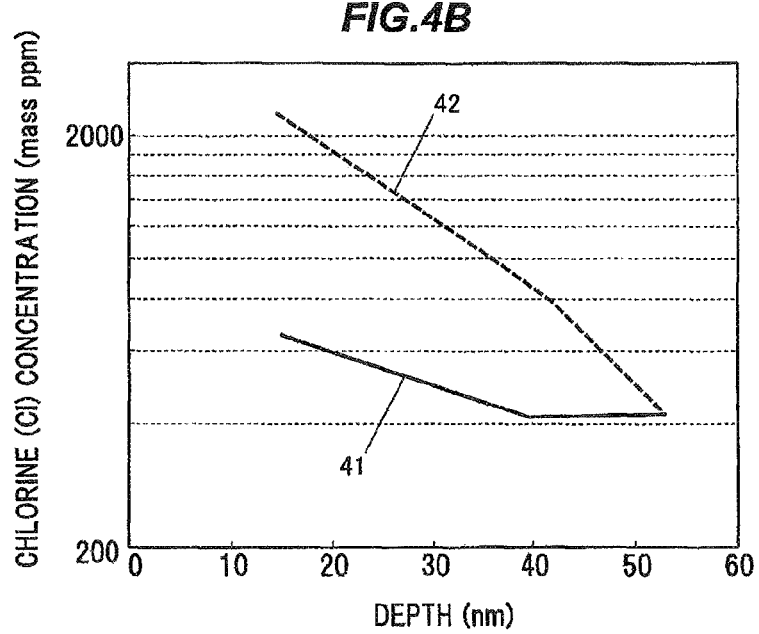

FIG.9A
FIG.9B
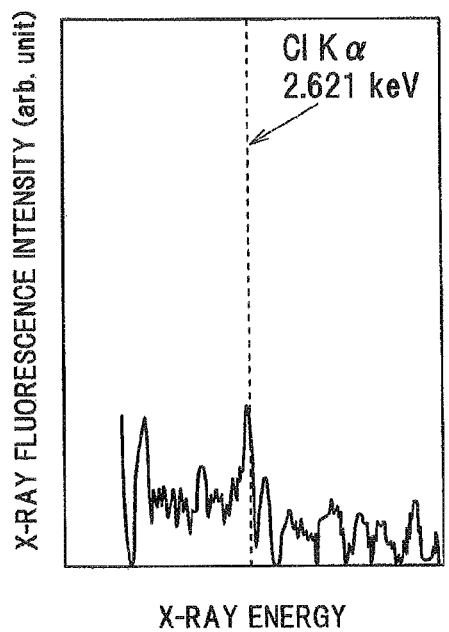
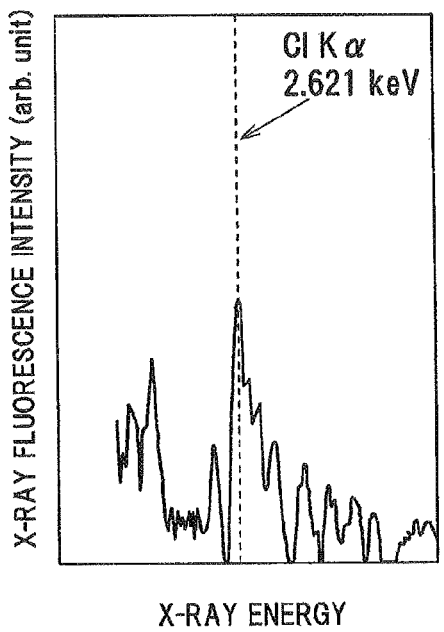

REFINED COPPER, METHOD OF PRODUCING REFINED COPPER, ELECTRIC WIRE AND METHOD OF MANUFACTURING ELECTRIC WIRE

The present application is based on Japanese patent application No. 2016-094587 filed on May 10, 2016, the entire contents of which are incorporated herein by reference.

BACKGROUND OF THE INVENTION

1. Field of the Invention

The invention relates to refined copper, a method of producing the refined copper, an electric wire and a method of manufacturing the electric wire.

2. Description of the Related Art (About Refined Copper)

In general, copper sheets (electrolytic copper) refined by electroplating are used as a conductor material for copper electric wire. In the conventional electrorefining process of copper sheet, electricity is directly passed from a blister copper arranged on the anode side to a metal plate arranged on the cathode side in an electrolytic tank filled with a sulfuric acid-cupric sulfate ($CuSO_4$) solution, and copper ions dissolved in the anode side are deposited on the surface of the metal plate on the cathode side.

Conventional technology (conventional process) and permanent cathode technology (PC method) are used as an electrorefining process to obtain refined copper from blister copper.

The conventional technology (conventional process) is a method in which a copper sheet called starting sheet is arranged as a cathode (negative electrode), copper is electrolytically deposited and grown on the copper sheet, electricity is stopped from flowing (or is short-circuited) and the cathode is moved up once reaching the desired amount, and a sheet material including the starting sheet is thereby obtained as a product.

Meanwhile, the permanent cathode technology (PC method) is a method in which a stainless steel plate is arranged as a cathode, and a copper plating layer (sheet material) formed on the stainless steel plate by electrodeposition is stripped from the stainless steel plate and is thereby obtained as a product. The stainless steel plate used as the cathode is reused (see, e.g., JP-A-2005-240146).

(About Electric Wire)

In general, most of copper wires used to form electric wires, etc., are manufactured by a mothed using a continuous casting and rolling process.

In the continuous casting and rolling process, a copper melt obtained by melting a raw material copper, such as the previously described refined copper, in a smelter is fed to a continuous caster such as belt conveyor via a transfer ladle or a holding tundish and is then continuously casted into a cast bar, and the cast bar is hot-rolled and then cooled to form a copper drawing stock having a predetermined relatively large diameter. Then, the copper drawing stock as raw material undergoes an additional wire-drawing process and further appropriate annealing treatment, etc., and a copper wire having a desired diameter is thereby obtained.

Since the sulfuric acid-cupric sulfate ($CuSO_4$) solution is used in the electrorefining process of copper sheet as described above, the refined copper obtained by the electrorefining process inevitably contains sulfur (S). The same occurs with non-electrolytic refining. Therefore, the copper wire formed using the sulfur-containing refined copper as a raw material copper unavoidably contains sulfur. The contained sulfur can be a cause of a decrease in performance of copper wire or unstable production and thus needs to be eliminated.

It is necessary to sufficiently reduce sulfur dissolved in molten copper (to separate sulfur from copper) especially in order to improve conductivity directly linked to performance of copper wire and to provide a lower softening temperature contributing to stable production of copper wire.

In practice, an impurity concentration can be efficiently reduced when oxygen is present in copper at a predetermined ratio more than in oxygen-free copper and forms an oxide due to reaction with an impurity such as sulfur dissolved in copper. In detail, a melt, which is adjusted to have an oxygen concentration of not more than 20 ppm and a sulfur concentration of not more than 6 ppm, is continuously casted at a casting temperature of not more than 1120° C., and the obtained cast bar is hot-rolled in a temperature range of 850° C. to 550° C. (a rolling start temperature of 850° C. and a rolling finishing temperature of 550° C.) (see JP-A-2010-234442).

Another specific method other than that described above is a method in which a metal, or an alloy, selected from Nb, Ti, Zi, Zr, V, Ta, Fe, Ca, Mg or Ni and easily and progressively reacts with S, in other words, an element having a lower standard Gibbs free energy in a chemical reaction with sulfur than in reaction with copper, is added at a predetermined ratio to a copper melt formed using tough pitch copper as a raw material copper so that such a metal (element) reacta with S contained in tough pitch copper melt and S is precipitated as a sulfide, thereby reducing a concentration of S which is dissolved in copper (see e.g. JP-A-2006-272422 and JP-A-2006-274383).

SUMMARY OF THE INVENTION

Since the cupric sulfate ($CuSO_4$) solution used as the previously described electrolytic plating bath or electroless plating bath is generally used with an addition of chloride ions, the refined copper also contain chlorine in addition to sulfur. The present inventors considered that the contained chlorine is also a cause of a decrease in performance of copper wire, etc., in the same manner as when containing sulfur.

In the permanent cathode technology (PC method) described in JP-A-2005-240146, a stainless steel palate is arranged as a cathode. In this case, due to displacement deposition of copper on a base metal such as zinc (Zn), chrome (Cr), iron (Fe) or nickel (Ni), ions are eluted from the stainless steel plate consisting mainly of iron and the stainless steel plate significantly deteriorates each time undergoing the refining process. Therefore, the frequency of reuse of the stainless steel plate is limited.

In the copper wire production of JP-A-2010-234442 using electrolytic copper, etc., as a raw material, since sulfur in copper melt obtained by melting at high temperature is removed by reaction with oxygen and removal of the resulting reaction product, concentrations and casting temperature need to be properly controlled such that the raw material copper is precisely pre-adjusted to have the oxygen concentration of not more than 20 ppm and the sulfur concentration of not more than 6 ppm and that the melt is continuously casted at not more than 1120° C., and the process margin of the copper wire production is therefore small. In other words, there are many casting control parameters and there is thus the concern that the production yield decreases.

Furthermore, the copper wire manufacturing methods described in JP-A-2006-272422 and JP-A-2006-274383 require to uniformly disperse an additive metal element in a high-temperature melt. Therefore, unknown production parameters increase and essentially need to be controlled, and it is predicted that the manufacturing process becomes unstable. In addition, there are problem that a precise quality control of the additive metal (element) is required and use of the rare metal (e.g., Nb, Zr, V, Ta, etc.) as an additional material increases the cost.

It is an object of the invention to provide an electric wire and a method of manufacturing the electric wire that allow stable production of high quality copper wires (copper wires having high conductivity and low softening temperature) as well as a reduction in the manufacturing cost.

(1) According to an embodiment of the invention, a method of producing a refined copper comprises depositing the refined copper on a cathode by an electroplating process or an electroless plating process in an alkaline plating bath comprising a solution of a copper compound that includes none of sulfur, chlorine and oxygen elements and produces copper ions having a valence of +1 in the solution.

(2) In the method defined by (1), the copper compound may comprise a copper cyanide.

(3) In the method defined by (1) or (2), only the copper compound may compose a copper compound in the plating bath.

(4) In the method defined by one of (1) to (3), a sulfur concentration in the refined copper from an outermost surface to a depth of 80 nm may be not more than 620 mass ppm.

(5) In the method defined by one of (1) to (4), a chlorine concentration in the refined copper from an outermost surface to a depth of 60 nm may be not more than 700 mass ppm.

(6) In the method defined by one of (1) to (5), a sulfur concentration in the refined copper from an outermost surface to a depth of 2.5 µm may be not more than 300 mass ppm.

(7) In the method defined by one of (1) to (6), a chlorine concentration in the refined copper from an outermost surface to a depth of 2.5 µm may be not more than 61 mass ppm.

(8) In the method defined by one of (1) to (7), a sulfur concentration in an entirety of the refined copper may be not more than 3.1 mass ppm.

(9) In the method defined by one of (1) to (8), a chlorine concentration in an entirety of the refined copper may be not more than 1.1 mass ppm.

(10) In the method defined by one of (1) to (9), a particle size on a surface of the refined copper may be not less than 0.5 µm and not more than 5 µm.

(11) In the method defined by one of (1) to (10), a starting sheet comprising copper may be used as the cathode and included in the refined copper, and wherein a sulfur concentration in an entirety of the refined copper including the starting sheet may be not more than 3.1 mass ppm.

(12) In the method defined by one of (1) to (11), a starting sheet comprising copper may be used as the cathode and included in the refined copper, and wherein a chlorine concentration in an entirety of the refined copper including the starting sheet may be not more than 1.1 mass ppm.

(13) In the method defined by one of (1) to (10), a conductive metal plate comprising an alloy including at least one or more of stainless steel, transition metals or transition metal elements may be used as the cathode, and wherein the refined copper may be obtained by stripping from the conductive metal plate.

(14) In the method defined by one of (1) to (10), a conductive plate comprising a composite material comprising a metal in the form of mesh or plate and a carbon nanotube may be used as the cathode, and wherein the refined copper may be obtained by stripping from the conductive plate.

(15) According to another embodiment of the invention, provided is a refined copper wherein a sulfur concentration from an outermost surface to a depth of 80 nm is not more than 620 mass ppm.

(16) According to another embodiment of the invention, provided is a refined copper wherein a chlorine concentration from an outermost surface to a depth of 60 nm is not more than 700 mass ppm.

(17) According to another embodiment of the invention, provided is a refined copper wherein a sulfur concentration from an outermost surface to a depth of 2.5 µm is not more than 300 mass ppm.

(18) According to another embodiment of the invention, provided is a refined copper wherein a chlorine concentration from an outermost surface to a depth of 2.5 µm is not more than 61 mass ppm.

(19) According to another embodiment of the invention, provided is a refined copper wherein a sulfur concentration in an entirety of the refined copper is not more than 3.1 mass ppm.

(20) According to another embodiment of the invention, provided is a refined copper wherein a chlorine concentration in an entirety of the refined copper is not more than 1.1 mass ppm.

(21) According to another embodiment of the invention, provided is a refined copper wherein a sulfur concentration from an outermost surface to a depth of 80 nm is not more than 620 mass ppm, wherein a chlorine concentration from the outermost surface to a depth of 60 nm is not more than 700 mass ppm, wherein a sulfur concentration from the outermost surface to a depth of 2.5 µm is not more than 300 mass ppm, wherein a chlorine concentration from the outermost surface to a depth of 2.5 µm is not more than 61 mass ppm, wherein a sulfur concentration in an entirety of the refined copper is not more than 3.1 mass ppm, and wherein a chlorine concentration in the entirety of the refined copper is not more than 1.1 mass ppm.

(22) According to another embodiment of the invention, provided is a refined copper wherein a particle size on a surface of the refined copper is not less than 0.5 µm and not more than 5 µm.

(23) According to another embodiment of the invention, a method of manufacturing an electric wire comprises making a wire conductor using the refined copper produced by the method defined by one of (1) to (14) or the refined copper defined by one of (15) to (22).

(24) In the method defined by (23), the wire conductor may have a sulfur concentration of not more than 3.1 mass ppm, a conductivity of not less than 102.5% IACS and a half-softening temperature of not less than 125° C. and not more than 133° C.

(25) According to another embodiment of the invention, an electric wire comprises a conductor that does not titanium as an additive element, and that has a sulfur concentration of not more than 3.1 mass ppm, a chlorine concentration of not more than 1.1 mass ppm, a conductivity of not less than 102.5% IACS and a half-softening temperature of not less than 125° C. and not more than 133° C.

Effects of the Invention

According to an embodiment of the invention, an electric wire and a method of manufacturing the electric wire can be provided that allow stable production of high quality copper wires (copper wires having high conductivity and low softening temperature) as well as a reduction in the manufacturing cost.

BRIEF DESCRIPTION OF THE DRAWINGS

Next, the present invention will be explained in more detail in conjunction with appended drawings, wherein:

FIGS. 4A and 4B are diagrams illustrating the results of SIMS analysis performed in a depth direction on the refined copper formed by the method of producing refined copper in Example of the invention (copper cyanide plating bath is used) and the refined copper formed by the conventional method of producing refined copper as Comparative Example (copper sulfate plating bath is used), wherein FIG. 4A shows the sulfur concentration and FIG. 4B shows the chlorine concentration;

FIG. 9A is a diagram illustrating an X-ray fluorescence peak profile of chlorine (Cl—Kα) of the refined copper formed by the method of producing refined copper in Example of the invention (copper cyanide plating bath is used);

FIG. 9B is a diagram illustrating an X-ray fluorescence peak profile of chlorine (Cl—Kα) of the refined copper formed by the conventional method of producing refined copper as Comparative Example (copper sulfate plating bath is used);

FIGS. 12A and 12B are diagrams illustrating the results of evaluating a wire conductor manufactured using the refined copper made by the method of producing refined copper in Example of the invention (copper cyanide plating bath is used) and a wire conductor manufactured using the refined copper made by the conventional method of producing refined copper as Comparative Example (copper sulfate plating bath is used), wherein FIG. 12A shows a relation between sulfur concentration and softening temperature and FIG. 12B shows a relation between sulfur concentration and conductivity.

DETAILED DESCRIPTION OF THE PREFERRED EMBODIMENTS

Method of Producing Refined Copper

Figure 1A:
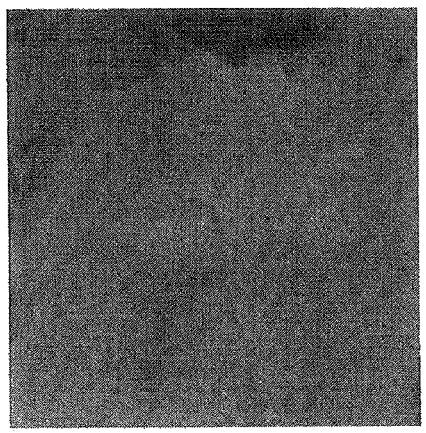
FIG. 1A is a photograph showing external appearance of refined copper formed by a method of producing refined copper in Example of the present invention (a plating bath containing a copper cyanide solution (hereinafter, sometimes referred to as copper cyanide plating bath) is used)

A method of producing refined copper in the embodiment of the invention include a step of depositing refined copper on a cathode by an electroplating process or an electroless plating process in an alkaline plating bath formed using a solution of a copper compound that does not contain any of sulfur, chlorine and oxygen elements. The refined copper in the invention means copper or copper alloy (including a starting sheet therein when not stripped from the starting sheet) which is used at least as a raw material to manufacture conductors (copper wires) of electric wires and is obtained by electrorefining or non-electrolytic refining. Therefore, copper foil (with a thickness of, e.g., not more than 100 μm) to not be used as a raw material to manufacture conductors (copper wires) of electric wires is not regarded as the refined copper of the invention. The size and shape of the refined copper manufactured according to the invention are not specifically limited, and the refined copper is, e.g., a copper plate of not less than 0.5 m in length, not less than 0.5 m in width and not less than 3 mm in thickness. The refined copper, when used as a raw material to manufacture conductors (copper wires) of electric wires, is preferably a copper plate of not less than 0.7 m and not more than 1.5 m in length, not less than 0.7 m and not more than 1.5 m in width and not less than 4 mm and not more than 10 mm in thickness. The embodiment of the invention will be described in detail below.

In the method of producing refined copper in the embodiment of the invention, either an electroplating process or an electroless plating process may be used but the electroplating process is preferably used. Next, the method using the electroplating process will be described as an example.

A plating solution contained in a plating bath is a solution of a copper compound which does not contain any of sulfur, chlorine and oxygen elements. Therefore, copper sulfate containing sulfur and oxygen elements and copper pyrophosphate containing oxygen element do not fall under the category of this copper compound.

The copper compound not containing any of sulfur, chlorine and oxygen elements is preferably a copper compound producing copper ions having a valence of +1 when dissolved in the solution. For example, copper cyanide is suitable as the copper compound producing copper ions having a valence of +1 when dissolved in the solution.

Preferably, the above-described copper compound not containing any of sulfur, chlorine and oxygen elements is the only copper compound used for the plating solution contained in the plating bath.

Example of How to Form Plating Bath

An example of how to form a plating bath used in the embodiment of the invention will be described below.

A copper cyanide plating bath used in the embodiment of the invention is made of the materials showing Table 1 below. Purified water after removing impurity components such as sulfur and chlorine is poured into an auxiliary tank in an amount of about 60% of the total amount of the plating bath. Next, sodium cyanide or potassium cyanide is added to and dissolved in the purified water. Then, pasty cuprous cyanide is added to and dissolved in this pre-made alkaline cyanide solution while stirring further using purified water. In addition, sodium hydroxide or potassium hydroxide is added to adjust pH (e.g., pH=9 to 13) and conductivity of the plating bath so that decomposition of cyanide is inhibited. After adding activated carbon, etc., and sufficiently stirring while heating to 40 to 70° C. which is close to practical plating bath solution temperature, the mixture is left to stand so that the activated carbon absorbs impurities and settles out. After that, the activated carbon, etc., trapping impurities is removed through a filtration equipment, the solution is transferred to a plating tank and the amount of the solution is adjusted by adding purified water, thereby obtaining a plating bath. This plating bath is analyzed. Then, additive materials are added, as needed, to improve and stabilize plating performance. In detail, an appropriate amount of sodium carbonate or potassium carbonate as a pH buffering agent (pH adjuster) is added. Then, potassium sodium tartrate (Rochelle salt) is added, as needed, to facilitate dissolution of copper used as an anode and thereby to efficiently supply copper ions. Lastly, a stainless steel plate is suspended as a cathode and a rolled copper sheet as an anode, and weak electrolysis is performed at a low current density (0.2 to 0.5 A/dm$^2$).

TABLE 1

Composition of copper cyanide plating bath

| Composition of plating bath | Chemical formula | Concentration (g/L) |
|---|---|---|
| Cuprous cyanide | CuCN | 15 to 120 |
| Sodium cyanide (or potassium cyanide) | NaCN (KCN) | 25 to 135 |
| Potassium sodium tartrate | KNaC$_4$H$_4$O$_6$•4H$_2$O | 15 to 60 |
| Sodium carbonate (or potassium carbonate) | Na$_2$CO$_3$ (K$_2$CO$_3$) | 10 to 30 |
| Sodium hydroxide (or potassium hydroxide) | NaOH (KOH) | 10 to 30 |

Example of How to Produce Refined Copper (Electrolytic Copper)

Next, an example of how to produce refined copper in the embodiment of the invention will be described.

Figures 11A, 11B, 11C:
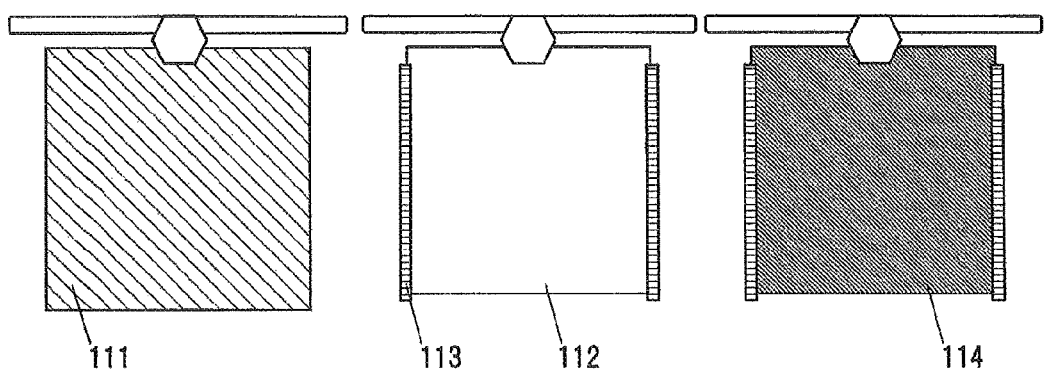
FIG. 11A is a schematic diagram illustrating an anode used in the method of producing refined copper in an embodiment of the invention.
FIG. 11B is a schematic diagram illustrating a cathode before formation of plating film.
FIG. 11C is a schematic diagram illustrating the cathode after formation of plating film.
Figure 11D:
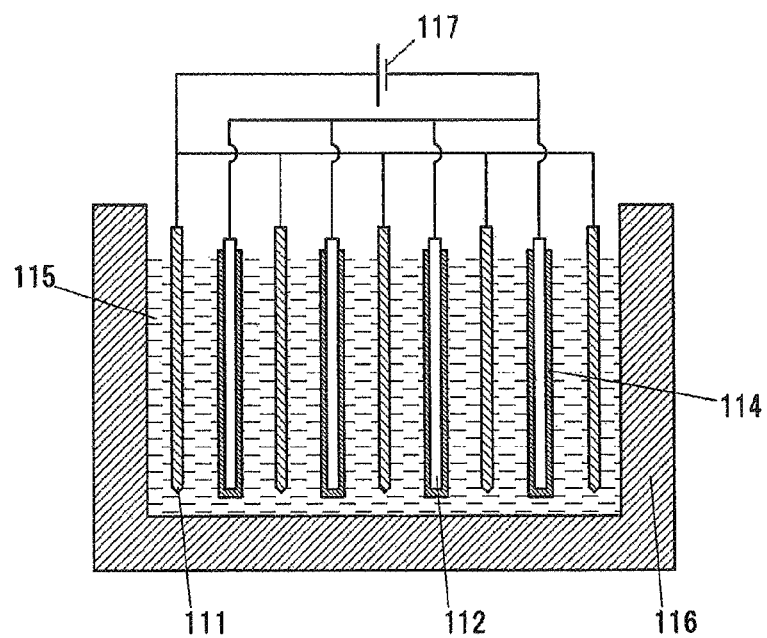
FIG. 11D is a schematic diagram illustrating an electroplating equipment.

FIG. 11A is a schematic diagram illustrating an anode used in the method of producing refined copper in the embodiment of the invention, FIG. 11B is a schematic diagram illustrating a cathode before formation of plating film, FIG. 11C is a schematic diagram illustrating the cathode after formation of plating film and FIG. 11D is a schematic diagram illustrating an electroplating equipment.

Anodes 111 formed by rolling/casting molten copper (blister copper with a purity of 99%) made of copper melt are prepared as a copper ion source for electroplating. Alternatively, a stainless steel plate or a titanium plate may be used as a cathode while using blister copper as an anode and, in this case, copper is deposited on a surface of the cathode by electrolysis, the formed pure copper sheet is stripped, and a resulting stripped copper sheet (electrolytic copper) with improved purity is used as the anode 111. Meanwhile, a thin copper sheet called starting sheet is used as a cathode 112. The cathodes 112, together with the anodes 111, are arranged in a plating tank 116 filled with a copper cyanide plating bath 115 and electricity is passed therethrough using a DC power supply 117. During when electricity is passed, copper is deposited on the surfaces of the cathodes 112 by electrolysis. The cathodes 112 are moved upward when copper plating growth layers 114 reach a desired weight, and refined copper (electrolytic copper) including the starting sheet is then obtained. The starting sheet used in the embodiment of the invention is preferably a copper sheet having a copper purity of not less than 99.9%, a sulfur concentration of not more than 3.4 mass ppm and a chlorine concentration of not more than 1.6 mass ppm.

Alternatively, stainless steel plates may be used as the cathodes 112 without using copper starting sheets and, in this case, the copper plating growth layers 114 electrodeposited on the cathodes 112 are stripped and obtained as refined copper (electrolytic copper). In the electroplating equipment shown in FIG. 11D, blister copper is used as the anode 111 in the same manner as the above-described electrolysis using a starting sheet but the cathode 112 is a stainless steel plate of which side portion is covered with a plating growth-inhibiting material 113 which does not conduct electricity (is not capable of receiving electrons) such as insulator.

Alternatively, instead of the stainless steel plate, a conductive metal plate formed of an alloy containing at least one or more of transition metals or transition metal elements, or a conductive plate formed of a composite material composed of a metal in the form of mesh or plate and a carbon nanotube, may be used as the cathode 112. The refined copper (electrolytic copper) is obtained by stripping from the conductive metal plate or the conductive plate.

Table 2 shows an example of the electroplating conditions in the method of producing refined copper in the embodiment of the invention.

TABLE 2

Electroplating conditions for copper cyanide plating

| Items | Control value |
| --- | --- |
| Temperature of plating bath (° C.) | 30 to 80 |
| Cathode current density (A/dm$^2$) | 0.2 to 10 |
| Anode current density (A/dm$^2$) | 0.1 to 5 |
| pH of plating bath | 10 to 13 |

In production of electrolytic copper using stainless steel plates as cathodes, it is possible to maintain a uniform current density across the entire surface of the cathode since the parallel distance between two electrodes is better than when using copper starting sheets and the surface is flat. Therefore, it is possible to increase current efficiency and to reduce the incidence of short-circuit and the frequency of correction work associated with the short-circuit faults. In addition, since a distance between the electrodes can be reduced, it is possible to increase the number of cathodes to be placed in the plating tank and thus possible to increase production capacity without additional equipment investments. Furthermore, since it is also possible to reduce effective voltage, reduction in power consumption is expected. Also when the conductive metal plate formed of an alloy containing at least one or more of transition metals or transition metal elements is used as the cathode 112 in place of the stainless steel plate, the same advantages are obtained. In addition, when the conductive plate formed of a composite material composed of a metal in the form of mesh or plate and a carbon nanotube is used as the cathode 112, it is possible to realize 100-fold current capacity of more than two digits while maintaining the same performance of electrical conductivity as that of the copper starting sheet and this allows the current limit value during electrolytic copper production to be improved. Therefore, it is possible to increase the growth rate of electrolytic plating as compared to the conventional technique and it is advantageous in that electrolytic copper can be produced highly efficiently. The key feature of each cathode is shown in

TABLE 3

Types, key features and advantages of cathodes used for production of refined copper

| Cathode | Key feature | Advantage |
| --- | --- | --- |
| Stainless steel plate | Equal distance between surfaces due to flat plate | Improvement in current efficiency by preventing short circuit |
| Copper plate | No need of stripping from starting sheet | Possible to shorten the process of electrolytic copper production |
| Composite material of carbon nanotube and metal | Increase in current capacity | Improvement in productivity by increase in film formation rate |

Refined Copper

The refined copper in the embodiment of the invention can be obtained by the above-described method of producing refined copper in the embodiment of the invention, and has one or more of the following characteristics. That is, the refined copper in the present embodiment is refined copper with controlled sulfur and/or chlorine concentrations within appropriate ranges (e.g., pure copper having a copper concentration of not less than 99.9%).

The sulfur concentration from the outermost surface to a depth of 80 nm in the refined copper is not more than 620 mass ppm and, in a preferred embodiment, not more than 613 mass ppm.

The chlorine concentration from the outermost surface to a depth of 60 nm in the refined copper is not more than 700 mass ppm and, in a preferred embodiment, not more than 653 mass ppm.

The sulfur concentration from the outermost surface to a depth of 2.5 μm in the refined copper is not more than 300 mass ppm and, in a preferred embodiment, not more than 296 mass ppm.

The chlorine concentration from the outermost surface to a depth of 2.5 μm in the refined copper is not more than 61 mass ppm and, in a preferred embodiment, not more than 60 mass ppm.

The sulfur concentration in the entire refined copper is not more than 3.1 mass ppm and, in a preferred embodiment, not more than 3.0 mass ppm. When a copper starting sheet is used as a cathode, the refined copper includes the starting sheet and the sulfur concentration in the entire refined copper including the starting sheet is not more than 3.1 mass ppm and, in a preferred embodiment, not more than 3.0 mass ppm.

The chlorine concentration in the entire refined copper is not more than 1.1 mass ppm and, in a preferred embodiment, not more than 1.0 mass ppm. When a copper starting sheet is used as a cathode, the refined copper includes the starting sheet and the chlorine concentration in the entire refined copper including the starting sheet is not more than 1.1 mass ppm and, in a preferred embodiment, not more than 1.0 mass ppm.

In the refined copper in the embodiment of the invention, a particle size on the surface of the refined copper is not less than 0.5 μm and not more than 5 μm and, in a preferred embodiment, not less than 1.1 μm and not more than 1.3 μm.

Impurity Concentration Analysis Methods

Detailed analysis of concentrations of trace amounts of impurities contained in three regions of the refined copper (electrolytic copper); a region near the surface, a region from the surface to a predetermined depth and the entire region, which has conventionally not been done, was conducted in the embodiment of the invention. That is, to precisely optimize the impurity concentrations, the following three analytical techniques were fully used to know the exact impurity concentrations. The present inventors particularly focused on the concentrations of sulfur and chlorine as impurities closely related to a decrease in basic performance (a decrease in conductivity and an increase in softening temperature) of copper wire conductor. Any of the following analysis methods can be used to measure the sulfur and chlorine concentrations in the three regions of the refined copper (electrolytic copper); a region near the surface, a region from the surface to a predetermined depth and the entire region, or to measure the sulfur and chlorine concentrations in a wire conductor.

(1) Secondary Ion Mass Spectrometry

This analysis method is also called SIMS analysis (an abbreviation of Secondary Ion Mass Spectrometry). The principle of this analysis is as follows: a surface of a solid material is exposed to $C_S^+$ or $O_2^+$ ions having an energy of several hundred eV to several tens of KeV, individual ions emitted from the material surface through sputter etching are mass-separated by an electric field or a magnetic field, and mass spectrometry is conducted by a detector such as Faraday cup or electron multiplier to identify elements present on the material surface and to measure concentrations thereof. This analysis method uses a measurement technique which is in principle capable of analyzing an ultra-trace amount of element with a detection limit of several hundred ppb to 0.1 ppm in analysis of regions near the surface and in a depth direction. Therefore, in Example described later, the concentrations of impurities (sulfur (S) and chlorine (Cl), etc.) contained in the adhered state, the segregated state, the dissolved state or at least two or more of these states were measured in a region near the surface (from the surface to a depth of about 60 to 80 nm) of the electrolytic copper. In Example, the detection limit is $1 \times 10^{16}$ atoms/cm$^3$ for S and $8 \times 10^{15}$ atoms/cm$^3$ for Cl, and the detection limit in terms of mass concentration is 0.06 mass ppm for S and 0.05 mass ppm for Cl. The measurement conditions in Example are shown in Table 4 below. After sputter etching followed by the concentration measurement, the depth was actually measured by a stylus-based profilometer, e.g., Tencor P10, Tencor P20 or Alpha Step 500, etc.

TABLE 4

Measurement conditions for secondary ion mass spectrometry

| Items | Conditions |
|---|---|
| Element (ion) measured | S, Cl |
| Irradiation ion beam | Cs$^+$ |
| Irradiation ion energy | 14.5 keV |
| Polarity of measured secondary ion | Negative |

(2) X-Ray Fluorescence Analysis

This analysis is also called XRF analysis (an abbreviation of X-ray fluorescence analysis). This method is a non-destructive analysis and is excellent particularly for quality control on production line. The principle of this analysis is as follows: a surface of a material is exposed to X-rays to eject inner shell electrons from individual atoms contained in the material, and energy and intensity of X-ray fluorescence resulting from transition of adjacent electrons from higher energy level to lower energy levels after ejection of electrons are measured by a detector. Since the X-ray fluorescence energy (wavelength) of each element is known, it is possible to specify the elements present in the material and to measure the concentrations of the contained elements. A wavelength-dispersive X-ray fluorescence spectrometer (model: ZSX Primus II, manufactured by Rigaku Corporation) was used in Example described later. Since the elements to be analyzed here are sulfur and chlorine which have adjacent atomic numbers and thus emit X-ray fluorescence of similar energy, the analysis was conducted using a wavelength-dispersive spectrometer which is less affected by overlap of x-ray fluorescence peaks and has high X-ray energy resolution. The measurement conditions in Examples are shown in Table 5 below.

TABLE 5

Measurement conditions for wavelength-dispersive X-ray fluorescence analysis

| Items | Conditions |
|---|---|
| Radiation source | Rh tube (K$\alpha_1$ = 20.2161 keV) |
| Output | 50 kV, 50 mA |
| Detector | SC (scintillation counter) |
| | PC (proportional counter) |
| Spectrometer | LiF crystal (heavy element) |
| | Ge, PET crystal (light element) |
| Diameter analyzed | φ10 mm |
| Degree of vacuum in measurement chamber | 1 to 10 Pa |
| Element measured | S (K$\alpha_1$ = 2.3078 keV) |
| | Cl (K$\alpha_1$ = 2.6224 keV) |

(3) High-Frequency Combustion-Infrared Absorption Analysis

This analysis method is a destructive analysis but is advantageous in that the concentrations of impurity elements contained in the entire refined copper (electrolytic copper) can be precisely measured down to several ppm. CSLS600 manufactured by LECO Corporation was used in Example described later. The detailed procedure was as follows: Firstly, a sample was cut. 2 g of analytical sample taken therefrom and 1 g of copper combustion improver were put in a ceramic crucible for combustion. At this time, the measurement sample was combusted in an oxygen stream by means of high-frequency heating to cause reaction of S (sulfur) in copper with oxygen, and SO$_2$ as a volatile substance produced as a result of the reaction was measured by an infrared detector. Measurement reproducibility was checked by performing measurement at least twice or more and it was confirmed that measurement was precise. Based on the confirmation, the average values were defined as the analytical values.

Cost Reduction in Electrolytic Copper Production

When a copper cyanide (CuCN) solution is used as a plating bath for electroplating, reaction to produce Cu metal from Cu ions is expressed by the following equation (1). This shows that a Cu$^+$ ion having a valence of 1 accepts one electron and thereby turns into a Cu atom (metal).

$$Cu^+ + e^- \rightarrow Cu \qquad (1)$$

In the equation (1), one electron is required for one Cu ion and the quantity of electric charge required to produce 1 mol of Cu is about 96,485 (C) (equivalent to Faraday constant) derived by multiplying the elementary charge by Avogadro constant. Therefore, taking into account that the atomic weight of copper is 63.54, the quantity of electric charge required to produce 1 g of copper is about 1,518 (C/g).

In practice, producing electrolytic copper of, e.g., 1.2 m in length, 1.0 m in width and 5 mm in thickness means to produce 53,640 g of electrolytic copper since the specific gravity of copper is 8.94. Therefore, in this case, the required quantity of electric charge is about 81,452,207 (C). Then, when the current density during electroplating is 5 A/dm² and electric current flowing through a surface of the cathode is 600 A, a relation of current i, quantity of electric charge Q and time t is expressed by the formula (2). Therefore, the production (plating) time is estimated to be about 135,754 seconds (about 37.7 hours).

$$i = dQ/dt \qquad (2)$$

Meanwhile, when a conventional cupric sulfate ($CuSO_4$) solution is used as a plating bath for electroplating, reaction to produce a Cu atom (metal) from Cu ions is expressed by the following equation (3). This shows that a $Cu^+$ ion having a valence of 2 accepts two electrons and thereby turns into a Cu atom (metal).

$$Cu^{2+} + 2e^- \rightarrow Cu \qquad (3)$$

In the equation (3), two electrons are required for one Cu ion and the quantity of electric charge required to produce 1 mol of Cu is about 192,971 (C) which is double the value derived by multiplying the elementary charge by Avogadro constant, and the quantity of electric charge required to produce 1 g of copper is about 3,037 (C/g). Therefore, when producing electrolytic copper of the same size as described above, the required quantity of electric charge is about 162,904,415 (C). When the current density is the same as described above and is 5 A/dm², the required production time is considered to be about 271,507 seconds (about 75.4 hours) based on the formula (2).

In other words, electrolytic copper formed in the plating bath of the copper cyanide (CuCN) solution containing copper ions having a low valence (a valence of +1) can be, in principle, produced in half the time it takes when using the plating bath of the sulfuric acid-cupric sulfate ($CuSO_4$) solution. Therefore, if voltage and current used for electroplating are the same, power consumption directly linked to an increase or decrease in plating time is considered to be halved and it is thus possible to reduce the energy cost. In addition, since factory operating time to produce electrolytic copper is halved, labor cost per production volume is expected to be reduced. Putting it the other way around, use of copper cyanide plating allows a double amount of electrolytic copper to be produced within the time required when using cupric sulfate plating, which improves production throughput of electrolytic copper and of high-quality electric wires using the electrolytic copper as a raw material.

Method of Manufacturing Electric Wire

The method of manufacturing an electric wire in the embodiment of the invention includes a step of making a wire conductor using refined copper produced by the above-described method of producing refined copper in the embodiment of the invention or using the above-described refined copper in the embodiment of the invention.

The electric wire can be manufactured by a known electric wire manufacturing method, except that the above-described refined copper is used as a material of the wire conductor.

The wire conductor has a sulfur concentration of not more than 3.1 mass ppm, a conductivity of not less than 102.5% IACS and a half-softening temperature of not less than 125° C. and not more than 133° C. In a preferred embodiment, the sulfur concentration is not more than 2.5 mass ppm, the conductivity is not less than 102.6% IACS and the half-softening temperature is not less than 125° C. and not more than 131° C.

Electric Wire

The electric wire in the embodiment of the invention can be obtained by the above-described method of manufacturing an electric wire in the embodiment of the invention.

The electric wire in the embodiment of the invention is provided with a conductor not containing titanium as an additive element and having a sulfur concentration of not more than 3.1 mass ppm, a chlorine concentration of not more than 1.1 mass ppm, a conductivity of not less than 102.5% IACS and a half-softening temperature of not less than 125° C. and not more than 133° C. In a preferred embodiment, the conductor does not contain titanium as an additive element, and has a sulfur concentration of not more than 2.5 mass ppm, a chlorine concentration of not more than 1.1 mass ppm, a conductivity of not less than 102.6% IACS and a half-softening temperature of not less than 125° C. and not more than 131° C.

The configuration of the electric wire is not specifically limited and the electric wire may have various configurations. For example, the conductor may be formed of a single strand or plural strands, and the number of conductors is not limited to one and may be two or more.

Effects of the Embodiment of the Invention

The plating bath using the copper cyanide (CuCN) solution in the embodiment of the invention does not contain inevitable impurities such as sulfur and chlorine which are contained in the conventionally often used cupric sulfate ($CuSO_4$) solution. Therefore, except for contamination with trace amounts of sulfur and chlorine, etc., due to external environment such as a distance from seashores or volcanic belts to factory sites or water source to be used, refined copper (electrolytic copper) does not contain sulfur and chlorine, etc., derived from the raw materials. Therefore, when using such refined copper as a raw material to form copper wires, a decrease in quality (a decrease in conductivity and an increase in softening temperature) due to containing sulfur and chlorine, etc., is prevented. In other words, it is possible to realize a copper electric wire in which the concentrations of sulfur and chlorine, etc., are reduced as much as possible, and high-performance copper wires with high conductivity and low softening temperature can be manufactured in high yield.

In addition, the plating bath using the copper cyanide (CuCN) solution has better throwing power than the conventional plating bath of the cupric sulfate ($CuSO_4$) solution and is thus suitable for producing electrolytic copper on a large area.

Meanwhile, when electrolytic copper refining is performed by an electroplating process while using a steel plate of stainless steel, etc., as a cathode to grow a copper plating layer, use of the plating bath of the cupric sulfate ($CuSO_4$) solution causes displacement deposition in which ions of Cr, Fe or Ni, etc., having a higher ionization tendency than Cu are eluted and copper is precipitated, and the stainless steel plate deteriorates in a short period of time. In the plating bath of the copper cyanide (CuCN) solution in the embodiment of the invention which can solve such a problem, a reduction potential is lower than the plating bath of the cupric sulfate ($CuSO_4$) solution since copper ions have a valence of +1 and form cyano complexes ($[Cu(CN)_4]^{3-}$), resulting in that displacement deposition substantially does not occur and metal ions are substantially not eluted from the stainless steel plate which thus shows less deterioration. Therefore, it is advantageous in that recyclability of the stainless steel plate is excellent and it is possible to reduce the cost of purchasing new stainless steel plates.

Furthermore, since an interfacial reaction layer associated with the displacement deposition is hardly formed and a deposited copper plating sheet is less adhesive, the copper plating sheet can be stripped from a starting sheet with a lower tensile stress than when using the conventional copper sulfate plating and it is thereby possible to prevent the copper plating sheet from being partially stripped or cracking. As a result, workload for a stripping process can be reduced as compared to the conventional electrolytic copper production, and productivity and yield are improved.

As previously described, the valence of copper ion in the plating bath of the copper cyanide (CuCN) solution used in the embodiment of the invention is one-half of the valence of those in the conventional plating bath of the cupric sulfate ($CuSO_4$) solution. Therefore, when the thickness of a plating layer (electrolytic copper) to be produced is the same, the current density (power consumption) required for electroplating is half of that in the conventional technique and it is therefore possible to advantageously halve the energy cost. In addition, in case of production with the same current density as when using the conventional plating bath of the cupric sulfate ($CuSO_4$) solution, electrolytic copper having a desired thickness (weight) can be produced in half the time (operating time of refining plant is advantageously halved), which allows an electrolytic copper production process with improved throughput to be established and thus the total production cost including working hours, etc., to be reduced. In other words, with the same power consumption and the same production time, it is possible to produce twice as much electrolytic copper as the conventional technique and it is possible to manufacture twice as many high-performance electric wires with the same energy cost.

In addition, while the conventional plating bath of the cupric sulfate ($CuSO_4$) solution is highly acidic and use thereof requires a measure for preventing equipment and components inside buildings from rusting, the plating bath of the copper cyanide (CuCN) solution in the invention is alkaline and has a low impact on aged deterioration of the components due to oxidation. Therefore, use of the copper cyanide (CuCN) solution is advantageous in that production facilities can have a longer life and also it is possible to prevent contamination with impurities such as corroded rust from such facilities during plating production.

In addition, the conventional copper sulfate solution is unstable as a plating bath since hydrolysis of copper occurs, sediments are likely to be formed and the copper ion concentration largely varies. On the other hand, the copper plating solution containing cyanide used in the invention is excellent in long-term storage stability since the function as a complexing agent prevents formation of hydroxide sediments in an alkaline solution and maintains the constant concentration, and the plating solution shows less deterioration since cyanogen and copper ions form stable complexes.

In addition, in the embodiment of the invention, since the refined copper in the embodiment of the invention is used as a raw material of the wire conductor, it is possible to obtain a wire conductor with less inevitable impurities (sulfur (S) and chlorine (Cl)) than those contained in refined copper conventionally used as a raw material and formed using the plating bath of the cupric sulfate ($CuSO_4$) solution. Therefore, in manufacturing of wire conductors, it is possible to omit a process of eliminating sulfur and chlorine mixed in conductors or to control the impurity concentrations to a desired level by removing only small amounts of impurities, and it is thus possible to stably mass produce high-quality conductors.

In addition, by using the wire conductors formed using the refined copper in the embodiment of the invention, high-quality audio cables and wiring materials for audio equipment capable of efficiently transmitting electrical signals across a wide frequency range can be mass-produced at lower cost in a shorter period of time than copper electric wires manufactured by the conventional method. In addition, the refined copper in the embodiment of the invention can be used as a material of extra-fine connection conductors used in semiconductor devices or MEMS devices, etc., to connect between microscopic devices at narrow pitches, and stable supply of such a material is realized at low cost.

EXAMPLES

Next, the invention will be described in more detail based on Examples. However, the invention is not limited thereto.

Production of Refined Copper (Electrolytic Copper) in Example and Comparative Example In Example and Comparative Example, a starting sheet (rolled copper sheet) was used as a cathode to form copper plating. The compositions of the plating baths used are as shown in Table 6 below, and the electroplating conditions are as shown in Table 7 below. Configuration comparison and concentration analysis described later were conducted on the produced refined coppers.

TABLE 6

Composition of plating bath

| | Composition of plating bath | Chemical formula | Concentration (g/L) |
|---|---|---|---|
| Example | Cuprous cyanide | CuCN | 100 |
| | Sodium cyanide | NaCN | 125 |
| | Sodium carbonate | $Na_2CO_3$ | 15 |
| | Sodium hydroxide | NaOH | 30 |
| Comparative Example | Copper sulfate | $CuSO_4 \cdot 5H_2O$ | 220 |
| | Sulfuric acid (98%) | $H_2SO_4$ | 55 |
| | Sodium chloride | NaCl | 0.1 |

TABLE 7

Electroplating conditions

| | Items | Control value |
|---|---|---|
| Example | Temperature of Plating bath (° C.) | 78 |
| | Cathode current density ($A/dm^2$) | 2 |
| | Anode current density ($A/dm^2$) | 1 |
| Comparative Example | Temperature of Plating bath (° C.) | 25 |
| | Cathode current density ($A/dm^2$) | 2 |
| | Anode current density ($A/dm^2$) | 1 |

Figure 1B:
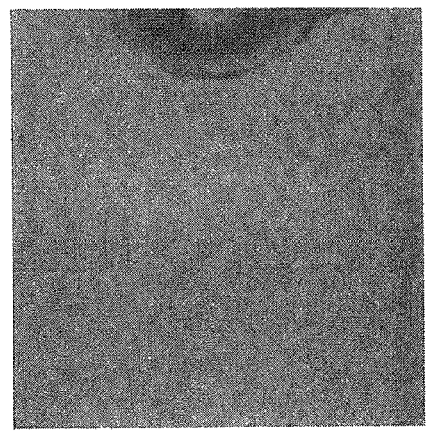
FIG. 1B is a photograph showing external appearance of refined copper formed by a conventional method of producing refined copper as Comparative Example (a plating bath containing a copper sulfate solution (hereinafter, sometimes referred to as copper sulfate plating bath) is used)
Figure 1C:
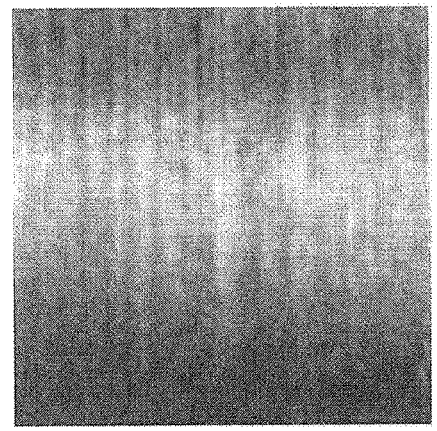
FIG. 1C is a photograph showing external appearance of a starting sheet (copper sheet)

Comparison in Refined Copper (Electrolytic Copper) Configuration Between Example and Comparative Example FIG. 1A is a photograph showing external appearance of refined copper (electrolytic copper) formed by the method of producing refined copper in Example of the present invention (copper cyanide plating bath is used), FIG. 1B is a photograph showing external appearance of refined copper (electrolytic copper) formed by the conventional method of producing refined copper as Comparative Example (copper sulfate plating bath is used) and FIG. 1C is a photograph showing external appearance of a starting sheet (copper sheet). The starting sheet (copper sheet) shown in FIG. 1C is in a state before degreasing to clean the surface.

Figure 2A:
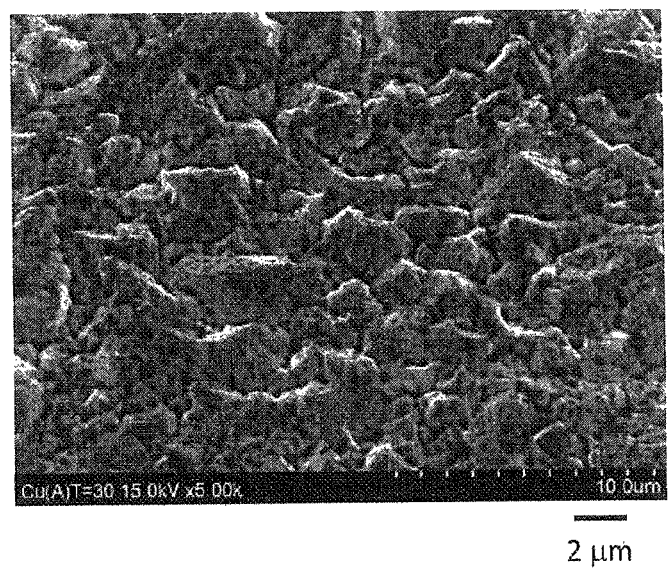
FIG. 2A is an SEM image showing a surface of the refined copper formed by the method of producing refined copper in Example of the invention (copper cyanide plating bath is used)
Figure 2B:
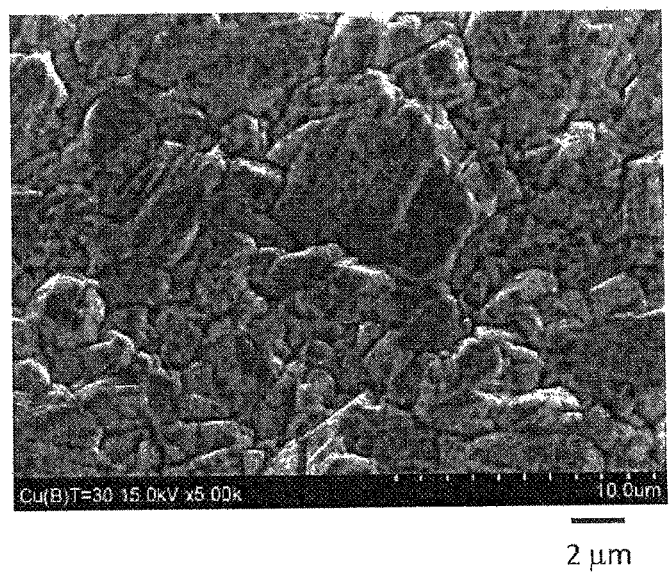
FIG. 2B is an SEM image showing a surface of the refined copper formed by the conventional method of producing refined copper as Comparative Example (copper sulfate plating bath is used)

FIG. 2A is an observation image by a scanning electron microscope (an SEM image) showing a surface of the refined copper (electrolytic copper) formed by the method of producing refined copper in Example of the invention (copper cyanide plating bath is used) and FIG. 2B is an SEM image showing a surface of the refined copper (electrolytic copper) formed by the conventional method of producing refined copper as Comparative Example (copper sulfate plating bath is used). The scanning electron microscope used here was a focused ion beam scanning electron microscopy (FIB-SEM) (the same applies below).

As understood from FIGS. 2A and 2B, individual copper particles grown in the refined copper obtained in Example (FIG. 2A) tend to be smaller than those in the refined copper obtained in Comparative Example (FIG. 2B). As a result of measuring particle size on the surface by the scanning electron microscope, the average particle size on the surface of the refined copper in Example was 1.2±0.1 μm and that in Comparative Example was 1.6±0.3 μm. A positive or negative (±) deviation with respect to the average obtained here is a standard deviation 1σ which was measurable within a measurement range of SEM observation in Example.

In addition, size distribution of grown particles on the surface of the refined copper in Example was uniform as compared to the refined copper in Comparative Example. This shows that the copper cyanide (CuCN) plating has excellent throwing power and is suitable for producing refined copper having uniform particle size.

Figure 3A:
FIG. 3A is an SEM image showing a cross section of the refined copper formed by the method of producing refined copper in Example of the invention (copper cyanide plating bath is used)
Figure 3B:
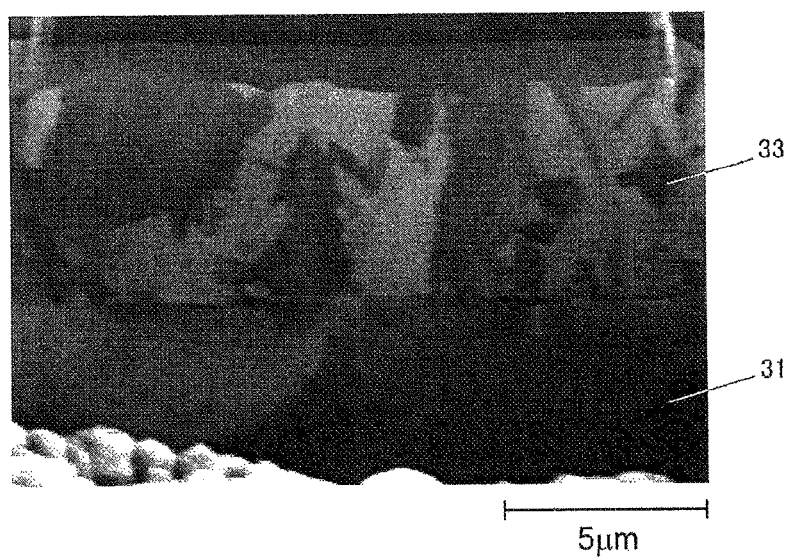
FIG. 3B is an SEM image showing a cross section of the refined copper formed by the conventional method of producing refined copper as Comparative Example (copper sulfate plating bath is used)

FIG. 3A is an SEM image showing a cross section of the refined copper (electrolytic copper) formed by the method of producing refined copper in Example of the invention (copper cyanide plating bath is used) and FIG. 3B is an SEM image showing a cross section of the refined copper (electrolytic copper) formed by the conventional method of producing refined copper as Comparative Example (copper sulfate plating bath is used). The viewing direction is tilted 45 degrees relative to a normal axis of the film surface (relative to the film thickness direction).

In FIG. 3A, a copper cyanide plating layer 32 is formed on a starting sheet (rolled copper sheet) 31. A mosaic gradation indicates a difference of crystal orientation (plane) at step surface of the plating layer and a polycrystal with random orientations is shown. In some cases, the copper plating layer is a single crystal without mosaic gradation or a monoaxially oriented polycrystal.

In FIG. 3B, a copper sulfate plating layer 33 is formed on the starting sheet (rolled copper sheet) 31. The copper sulfate plating layer 33 also exhibits a mosaic gradation and is a polycrystal with random orientations in the same manner as the copper cyanide plating layer 32 in FIG. 3A. The structure of the copper sulfate plating layer 33 is considered to be equivalent to the copper cyanide plating layer 32.

Concentrations of Sulfur and Chlorine Contained in Refined Copper (Electrolytic Copper)

FIGS. 4A and 4B are diagrams illustrating the results of SIMS analysis performed in a depth direction on the refined copper (electrolytic copper) formed by the method of producing refined copper in Example of the invention (copper cyanide plating bath is used) and the refined copper (electrolytic copper) formed by the conventional method of producing refined copper as Comparative Example (copper sulfate plating bath is used), wherein FIG. 4A shows the sulfur concentration and FIG. 4B shows the chlorine concentration. The concentrations were measured by the previously described Secondary ion mass spectrometry (SIMS analysis).

FIG. 4A shows the sulfur concentration from the surface up to a depth of about 80 nm in refined copper 41 of Example and in refined copper 42 of Comparative Example.

Sulfur may remain on the copper plating since contamination with sulfur derived from the air is unavoidable, but it is shown that the sulfur concentration near the surface in the refined copper 41 of Example is controlled to be not more than 620 mass ppm. On the other hand, the refined copper 42 of Comparative Example has a high sulfur concentration since the plating bath per se contains sulfur (S) and sulfur is thus mixed in the copper plating. It was found that the highest concentration of sulfur present in Comparative Example (around a depth of 12 nm) was more than 10000 mass ppm (1 mass %).

FIG. 4B shows the chlorine concentration from the surface up to a depth of about 60 nm in the refined copper 41 of Example and in the refined copper 42 of Comparative Example. It is shown that the chlorine concentration near the surface in the refined copper 41 of Example is controlled to be not more than 700 mass ppm. On the other hand, the chlorine concentration in the refined copper 42 of Comparative Example is higher than that in the refined copper 41 of Example. In general, chloride ions such as hydrochloric acid are added to the copper sulfate plating bath to maintain a smooth copper surface during electrodeposition. It is therefore considered that chlorine is mixed in the copper plating and the chlorine concentration is elevated. It was found that the highest concentration of chlorine present in Comparative Example (around a depth of 15 nm) was more than 2000 mass ppm (0.2 mass %).

Figure 5:
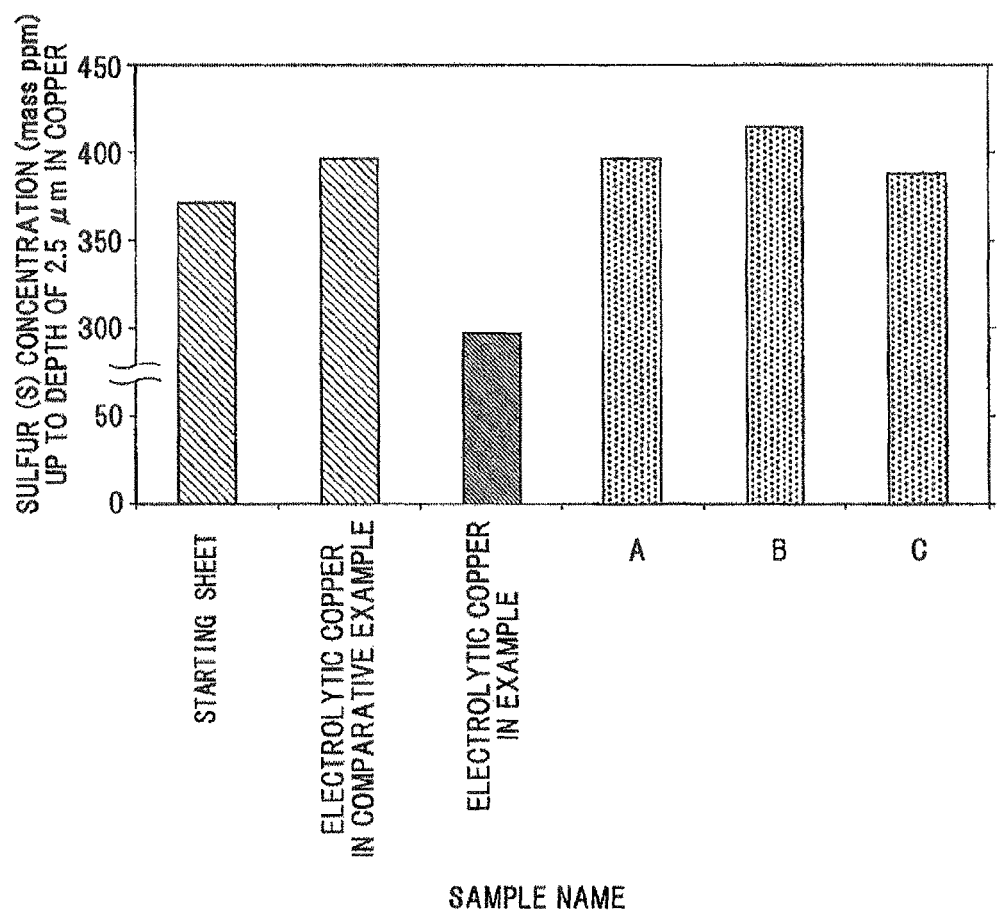
FIG. 5 is a comparative diagram illustrating the sulfur concentrations from the surface to a depth of 2.5 μm obtained by XRF analysis performed on the refined copper formed by the method of producing refined copper in Example of the invention (copper cyanide plating bath is used), the refined copper formed by the conventional method of producing refined copper as Comparative Example (copper sulfate plating bath is used), the starting sheet, and conventional refined coppers sold by other companies.

FIG. 5 is a comparative diagram illustrating the sulfur concentrations from the surface to a depth of 2.5 μm obtained by XRF analysis performed on the refined copper (electrolytic copper) formed by the method of producing refined copper in Example of the invention (copper cyanide plating bath is used), the refined copper (electrolytic copper) formed by the conventional method of producing refined copper as Comparative Example (copper sulfate plating bath is used), the starting sheet (rolled copper sheet) used, and conventional refined coppers (electrolytic copper) sold by other companies.

Figure 6A:
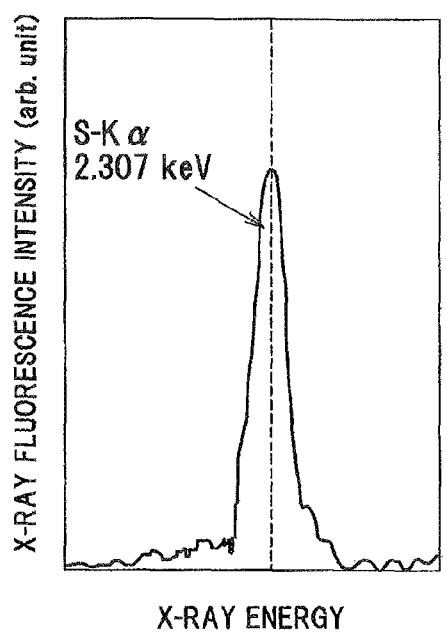
FIG. 6A is a diagram illustrating an X-ray fluorescence peak profile of sulfur (S—Kα) of the refined copper formed by the method of producing refined copper in Example of the invention (copper cyanide plating bath is used)
Figure 6B:
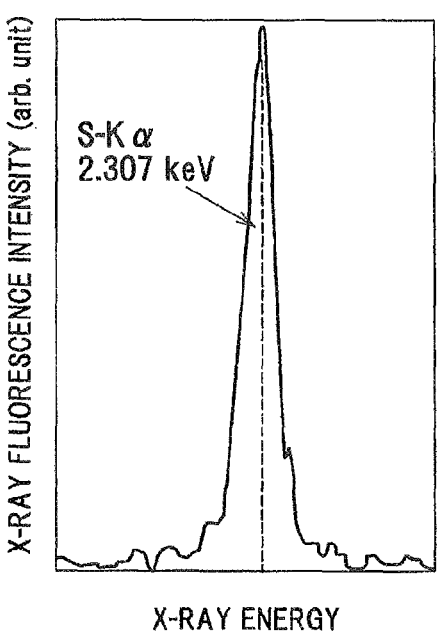
FIG. 6B is a diagram illustrating an X-ray fluorescence profile of sulfur (S—Kα) of the refined copper formed by the conventional method of producing refined copper as Comparative Example (copper sulfate plating bath is used)

The sulfur concentration was measured by the previously described X-ray fluorescence analysis method (XRF analysis) and was estimated based on S—Kα X-ray fluorescence intensity shown in FIGS. 6 and 6B. FIG. 6A is a diagram illustrating an X-ray fluorescence peak profile of sulfur (S—Kα) of the refined copper (electrolytic copper) formed by the method of producing refined copper in Example of the invention (copper cyanide plating bath is used) and FIG. 6B is a diagram illustrating an X-ray fluorescence peak profile of sulfur (S—Kα) of the refined copper (electrolytic copper) formed by the conventional method of producing refined copper as Comparative Example (copper sulfate plating bath is used).

It is understood from FIGS. 6 and 6B that the refined copper in Example has a lower S—Kα X-ray fluorescence peak intensity (a smaller integrated intensity) than that of the refined copper in Comparative Example and has a low sulfur concentration. Table 8 shows the measurement results of the sulfur concentration.

TABLE 8

XRF measurement results of sulfur concentration in refined copper (electrolytic copper)

| Samples | S concentration (mass ppm) |
|---|---|
| Starting sheet (rolled copper sheet) | 371 |
| Electrolytic copper in Comparative Example | 396 |

TABLE 8-continued

XRF measurement results of sulfur concentration
in refined copper (electrolytic copper)

| Samples | S concentration (mass ppm) |
| --- | --- |
| Electrolytic copper in Example | 297 |
| Electrolytic copper of company A | 396 |
| Electrolytic copper of company B | 414 |
| Electrolytic copper of company C | 388 |

The sulfur concentration from the surface to a depth of 2.5 μm in the electrolytic copper of Comparative Example was 396 mass ppm which is about 7% higher than 371 mass ppm in the starting sheet (rolled copper sheet). On the other hand, it was found that the sulfur concentration from the surface to a depth of 2.5 μm in the electrolytic copper of Example was 297 mass ppm which is about 20% lower than the starting sheet and about 25% lower than the electrolytic copper of Comparative Example. This shows that the electrolytic copper produced using the copper cyanide solution can have a low sulfur concentration even when a region near the surface is contaminated with sulfur during electrolytic copper production due to an external source such as the air. For reference, the average of the sulfur concentrations in refined coppers produced using a conventional electroplating technique and sold by other companies (A, B and C) was about 400 mass ppm.

Figure 7:
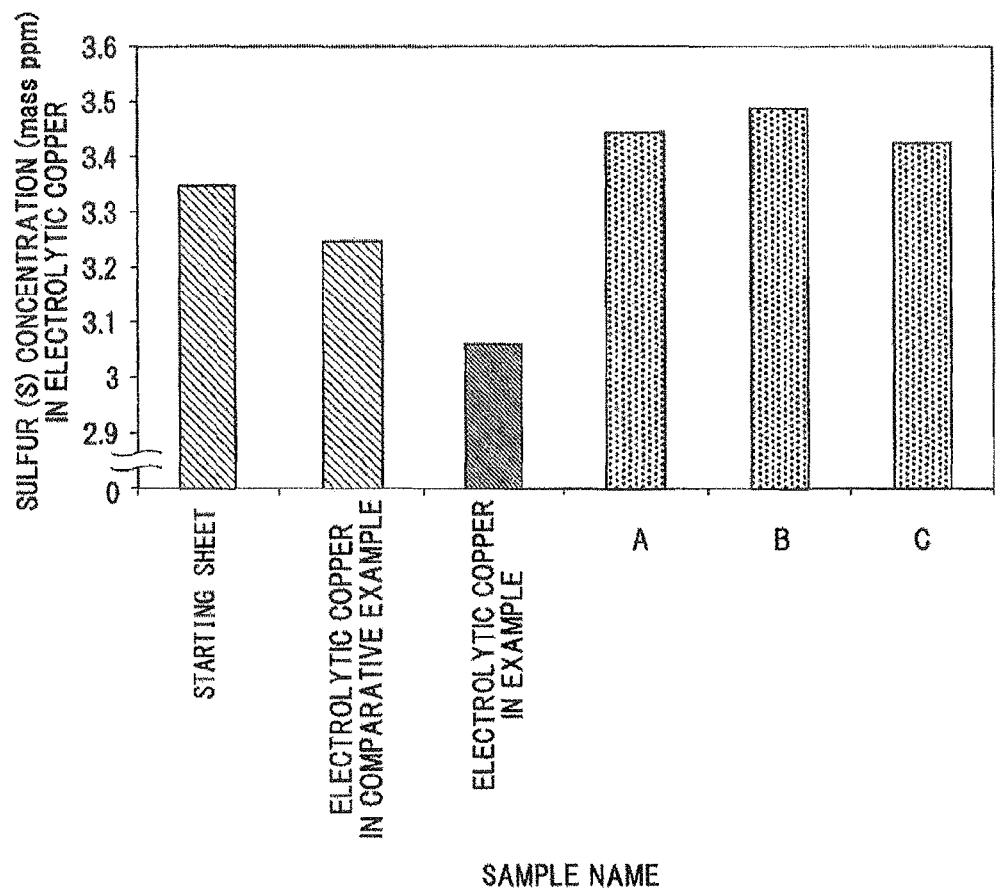
FIG. 7 is a comparative diagram illustrating the sulfur concentrations in the entire refined coppers obtained by high-frequency combustion-infrared absorption analysis performed on the refined copper formed by the method of producing refined copper in Example of the invention (copper cyanide plating bath is used), the refined copper formed by the conventional method of producing refined copper as Comparative Example (copper sulfate plating bath is used), the starting sheet, and conventional refined coppers sold by other companies.

FIG. 7 is a comparative diagram illustrating the sulfur concentrations in the entire refined coppers obtained by high-frequency combustion-infrared absorption analysis performed on the refined copper (electrolytic copper) formed by the method of producing refined copper in Example of the invention (copper cyanide plating bath is used), the refined copper (electrolytic copper) formed by the conventional method of producing refined copper as Comparative Example (copper sulfate plating bath is used), the starting sheet (rolled copper sheet) used, and conventional refined coppers (electrolytic copper) sold by other companies. The values calculated in terms of the average concentration of sulfur contained in the entire copper plating equivalent to typical electrolytic copper and having thickness of several mm are compared in FIG. 7.

The sulfur concentration was measured by the previously described high-frequency combustion-infrared absorption analysis. Table 9 shows the measurement results of the actual sulfur concentration.

TABLE 9

Sulfur concentration in the entire refined
copper (electrolytic copper)

| Samples | S concentration (mass ppb) |
| --- | --- |
| Starting sheet (rolled copper sheet) | 3350 |
| Electrolytic copper in Comparative Example | 3250 |
| Electrolytic copper in Example | 3060 |
| Electrolytic copper of company A | 3440 |
| Electrolytic copper of company B | 3490 |
| Electrolytic copper of company C | 3430 |

It is understood from Table 9 that the sulfur concentration in the entire electrolytic copper is within a range of 3000 to 3500 mass ppb in any of the samples and a difference therebetween is several hundred mass ppb. The sulfur concentration in the entire electrolytic copper of Example is 3060 mass ppb and is about 400 mass ppb less than the electrolytic coppers produced by the other companies.

When manufacturing highly conductive wires requiring to control the sulfur concentration to the order of sub-ppm or when there is a possibility that sulfur concentrated near the surface may affect the production yield of high-quality electric wires, electrolytic copper (raw material) with as reduced sulfur as possible is essential.

Figure 8:
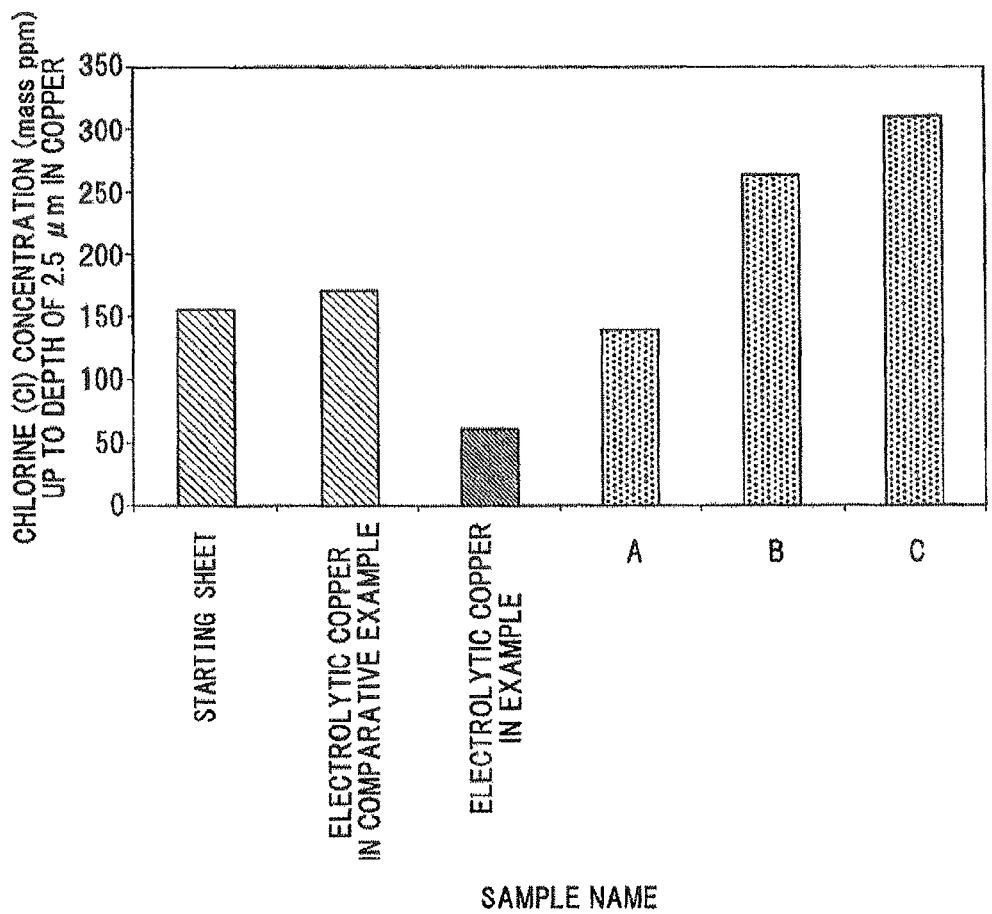
FIG. 8 is a comparative diagram illustrating the chlorine concentrations from the surface to a depth of 2.5 μm obtained by XRF analysis performed on the refined copper formed by the method of producing refined copper in Example of the invention (copper cyanide plating bath is used), the refined copper formed by the conventional method of producing refined copper as Comparative Example (copper sulfate plating bath is used), the starting sheet, and conventional refined coppers sold by other companies.

Meanwhile, FIG. 8 is a comparative diagram illustrating the chlorine concentrations from the surface to a depth of 2.5 μm obtained by XRF analysis performed on the refined copper (electrolytic copper) formed by the method of producing refined copper in Example of the invention (copper cyanide plating bath is used), the refined copper (electrolytic copper) formed by the conventional method of producing refined copper as Comparative Example (copper sulfate plating bath is used), the starting sheet (rolled copper sheet) used, and conventional refined coppers (electrolytic copper) sold by other companies.

The chlorine concentration was measured by the previously described X-ray fluorescence analysis method (XRF analysis) and was estimated based on Cl—Kα X-ray fluorescence intensity shown in FIGS. 9A and 9B. FIG. 9A is a diagram illustrating an X-ray fluorescence peak profile of chlorine (Cl—Kα) of the refined copper (electrolytic copper) formed by the method of producing refined copper in Example of the invention (copper cyanide plating bath is used) and FIG. 9B is a diagram illustrating an X-ray fluorescence peak profile of chlorine (Cl—Kα) of the refined copper (electrolytic copper) formed by the conventional method of producing refined copper as Comparative Example (copper sulfate plating bath is used).

It is understood from FIGS. 9A and 9B that the refined copper in Example has a lower Cl—Kα X-ray fluorescence peak intensity (a smaller integrated intensity) than that of the refined copper in Comparative Example and has a low chlorine concentration. Table 10 shows the measurement results of the chlorine concentration.

TABLE 10

XRF measurement results of chlorine concentration
in refined copper (electrolytic copper)

| Samples | Cl concentration (mass ppm) |
| --- | --- |
| Starting sheet (rolled copper sheet) | 156 |
| Electrolytic copper in Comparative Example | 171 |
| Electrolytic copper in Example | 61 |
| Electrolytic copper of company A | 140 |
| Electrolytic copper of company B | 265 |
| Electrolytic copper of company C | 312 |

The chlorine concentration from the surface to a depth of 2.5 μm in the electrolytic copper of Comparative Example was 171 mass ppm which is about 10% higher than 156 mass ppm in the starting sheet (rolled copper sheet). On the other hand, it was found that the chlorine concentration from the surface to a depth of 2.5 μm in the electrolytic copper of Example was 61 mass ppm which is about 60% lower than the starting sheet and about 64% lower than the electrolytic copper of Comparative Example. This shows that the electrolytic copper produced using the copper cyanide solution can have a low chlorine concentration even when a region near the surface is contaminated with chlorine during electrolytic copper production due to an external source such as the air. For reference, the average of the chlorine concentrations in refined coppers produced using a conventional electroplating technique and sold by other companies (A, B and C) was about 240 mass ppm.

Figure 10:
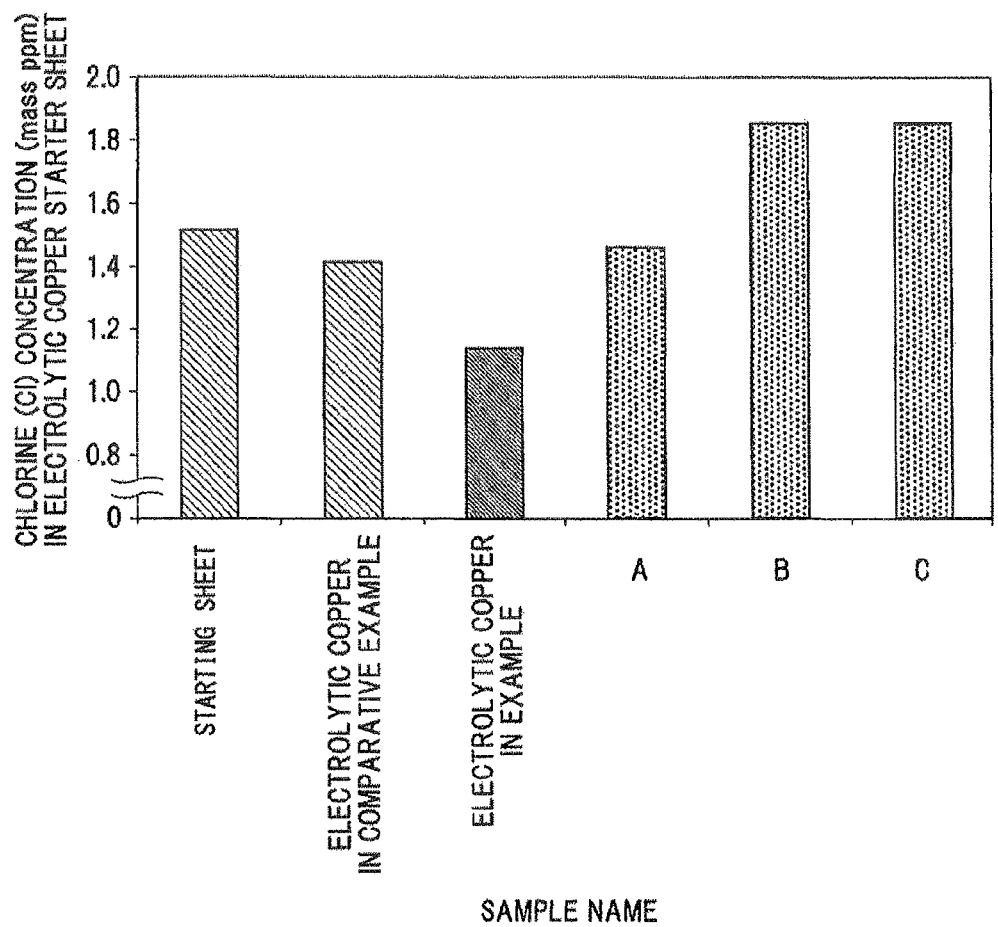
FIG. 10 is a comparative diagram illustrating the chlorine concentrations in the entire refined coppers obtained by ICP-MS analysis performed on the refined copper formed by the method of producing refined copper in Example of the invention (copper cyanide plating bath is used), the refined copper formed by the conventional method of producing refined copper as Comparative Example (copper sulfate plating bath is used), the starting sheet, and conventional refined coppers sold by other companies.

FIG. 10 is a comparative diagram illustrating the chlorine concentrations in the entire refined coppers obtained by ICP-MS analysis performed on the refined copper (electrolytic copper) formed by the method of producing refined copper in Example of the invention (copper cyanide plating bath is used), the refined copper (electrolytic copper) formed by the conventional method of producing refined copper as Comparative Example (copper sulfate plating bath is used), the starting sheet (rolled copper sheet) used, and conventional refined coppers (electrolytic copper) sold by other companies. The values calculated in terms of the average concentration of chlorine contained in the entire copper plating equivalent to typical electrolytic copper and having thickness of several mm are compared in FIG. 10. Table 11 shows the measurement results of the actual chlorine concentration.

TABLE 11

Chlorine concentration in the entire refined copper (electrolytic copper)

| Samples | Cl concentration (mass ppb) |
|---|---|
| Starting sheet (rolled copper sheet) | 1527 |
| Electrolytic copper in Comparative Example | 1425 |
| Electrolytic copper in Example | 1144 |
| Electrolytic copper of company A | 1473 |
| Electrolytic copper of company B | 1871 |
| Electrolytic copper of company C | 1871 |

It is understood from Table 11 that the chlorine concentration in the entire electrolytic copper is within a range of about 1100 to 1900 mass ppb in any of the samples. The chlorine concentration in the entire electrolytic copper of Example is 1144 mass ppb and is up to about 730 mass ppb less than the electrolytic coppers produced by the other companies.

When manufacturing highly conductive wires requiring to control the chlorine concentration to the order of sub-ppm or when there is a possibility that chlorine concentrated near the surface may affect the production yield of high-quality electric wires, electrolytic copper (raw material) with as reduced chlorine as possible is essential, in the same manner as sulfur.

According to the invention, it is possible to reduce the sulfur concentration and the chlorine concentration in the electrolytic copper (it is possible to control the sulfur concentration and the chlorine concentration within appropriate ranges). Therefore, when the electrolytic copper of the invention is used as a raw material to manufacture electric wires, it is possible to prevent a decrease in conductivity due to contamination with impurity elements and thus possible to stably produce high-quality copper electric wires.

Manufacturing and Evaluation of Wire Conductor

Next, wire conductors manufactured using the refined copper (electrolytic copper) of the invention as a raw material were subjected to measurement of the sulfur concentration and quality evaluation (conductivity and half-softening temperature). The details are as follows.

Examples 1 to 3

In Examples 1 to 3, electrolytic copper obtained through the same process as the above-described Example was melted, casted and then hot-rolled, thereby making drawing stocks. In Examples 1 to 3, however, the amount of sulfur or sulfuric acid ions in purified water used to control the concentration of the copper cyanide plating bath was adjusted by an ion-exchange resin and the sulfur concentration was changed. The drawing stocks were reduced in diameter to a desired outer diameter by cold rolling and were then annealed, thereby making wire conductors.

Comparative Examples 1 to 4

In Comparative Examples 1 to 4, electrolytic copper obtained through the same process as the above-described Comparative Example was melted, casted and then hot-rolled, thereby making drawing stocks. In Comparative Examples 1 to 4, however, the concentrations of copper sulfate and sulfuric acid in the plating bath were adjusted and the sulfur concentration was changed. The drawing stocks were reduced in diameter to a desired outer diameter by cold rolling and were then annealed, thereby making wire conductors.

Evaluation

Figure 12A:
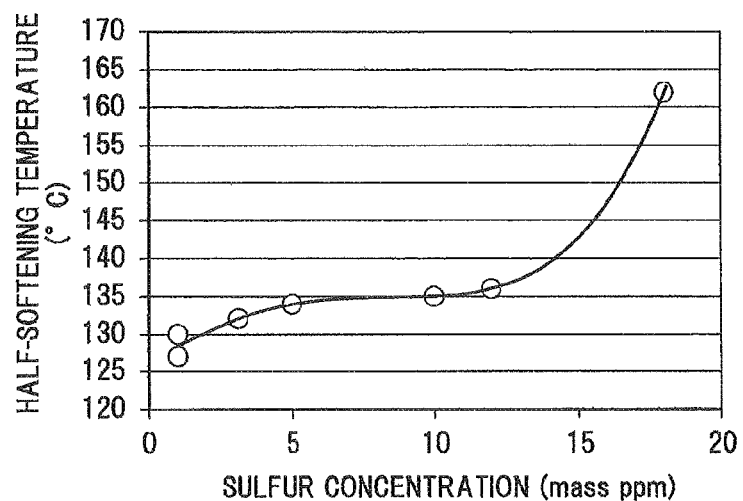
Figure 12B:
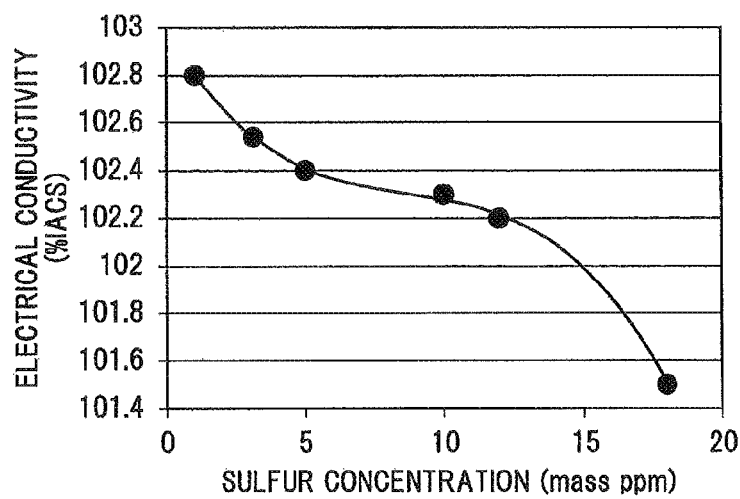

The wire conductors obtained in Examples 1 to 3 and Comparative Examples 1 to 4 were evaluated for the relation between sulfur concentration, conductivity and half-softening temperature. The results are shown in Table 12 below and FIGS. 12A and 12B. FIG. 12A shows the evaluation result of the relation between sulfur concentration and softening temperature and FIG. 12B shows the evaluation result of the relation between sulfur concentration and conductivity. The sulfur concentration was measured by the previously described X-ray fluorescence analysis.

Definition of Conductivity

Conductivity here is expressed as IACS (International Annealed Copper Standard) which is 100% at a resistivity of $1.7241 \times 10^{-8}$ Ωm.

Definition of Half-Softening Temperature

Half-softening temperature is a temperature corresponding to an average value of tensile strength before heating and tensile strength one hour after heating on a thermal softening curve representing the relationship between heating temperature (holding time of 1 hour) and tensile strength of copper conductor, and is a temperature at which tensile strength of the copper conductor is reduced to about half due to heating.

TABLE 12

S concentration in copper conductor and quality evaluation results (conductivity and half-softening temperature)

| Samples | S concentration (mass ppm) | Conductivity (% IACS) | Half-softening temperature (° C.) |
|---|---|---|---|
| Example 1 | 1 | 102.8 | 127 |
| Example 2 | 1 | 102.8 | 130 |
| Example 3 | 3.1 | 102.5 | 132 |
| Comparative Example 1 | 5 | 102.4 | 134 |
| Comparative Example 2 | 10 | 102.3 | 135 |
| Comparative Example 3 | 12 | 102.2 | 136 |
| Comparative Example 4 | 18 | 101.5 | 162 |

It is understood from Table 12 and FIGS. 12A and 12B that, according to the invention (Examples), it is possible to obtain wire conductors having a sulfur concentration of not more than 3.1 mass ppm, a conductivity of not less than 102.5% IACS and a half-softening temperature of not less than 125° C. and not more than 133° C. It is also understood that the higher the sulfur concentration, the more the quality of conductor (conductivity and half-softening temperature) is adversely affected. Meanwhile, the chlorine concentration measured by the previously described X-ray fluorescence analysis method was not more than 1.1 mass ppm in all of the conductors of Examples 1 to 3.

The invention is not limited to the embodiment and Examples and various modifications can be implemented.

What is claimed is:

1. A method of producing a refined copper, the method comprising:
    manufacturing a copper plate of not less than 3 mm in thickness by depositing the refined copper on a cathode by an electroplating process or an electroless plating process in an alkaline plating bath comprising a solution of a copper compound consisting of a copper cyanide that does not include any of sulfur, chlorine, and oxygen elements, and produces copper ions having a valence of +1 in the solution,
    wherein a sulfur concentration in an entirety of the copper plate is not more than 3.1 mass ppm, a chlorine concentration in the entirety of the copper plate is not more than 1.1 mass ppm, a sulfur concentration in the copper plate from an outermost surface to a depth of 80 nm is not less than 200 mass ppm and not more than 620 mass ppm, and chlorine concentration in the copper plate from the outermost surface to a depth of 60 nm is not less than 400 mass ppm and not more than 700 mass ppm.

2. The method according to claim 1, wherein a sulfur concentration in the refined copper from the outermost surface to a depth of 2.5 is not more than 300 mass ppm.

3. The method according to claim 1, wherein the chlorine concentration in the refined copper from the outermost surface to a depth of 2.5 μm is not more than 61 mass ppm.

4. The method according to claim 1, wherein a particle size on a surface of the refined copper is not less than 0.5 μm and not more than 5 μm.

5. The method according to claim 1, wherein a starting sheet comprising copper is used as the cathode and is included in the refined copper, and
    wherein a sulfur concentration in an entirety of the refined copper including the starting sheet is not more than 3.1 mass ppm.

6. The method according to claim 1, wherein a starting sheet comprising copper is used as the cathode and is included in the refined copper, and
    wherein a chlorine concentration in an entirety of the refined copper including the starting sheet is not more than 1.1 mass ppm.

7. The method according to claim 1, wherein a conductive metal plate comprising an alloy including at least one of stainless steel, transition metals, or transition metal elements is used as the cathode, and
    wherein the refined copper is obtained by stripping from the conductive metal plate.

8. The method according to claim 1, wherein a conductive plate comprising a composite material comprising a metal in a form of a mesh or a plate, and a carbon nanotube is used as the cathode, and
    wherein the refined copper is obtained by stripping from the conductive plate.

9. The method according to claim 1, wherein the depositing the refined copper on the cathode is performed by the electroless plating process.

10. The method according to claim 1, wherein the thickness of the copper plate is in a range from 4 mm to 10 mm.

11. The method according to claim 1, wherein the sulfur concentration in the entirety of the copper plate is not more than 3 mass ppm.

12. The method according to claim 11, wherein the chlorine concentration in the entirety of the copper plate is not more than 1 mass ppm.

13. The method according to claim 1, wherein the chlorine concentration in the entirety of the copper plate is not more than 1 mass ppm.

* * * * *